United States Patent [19]
Reneris

[11] Patent Number: 5,919,264
[45] Date of Patent: Jul. 6, 1999

[54] SYSTEM AND METHOD FOR USING DATA STRUCTURES TO SHARE A PLURALITY OF POWER RESOURCES AMONG A PLURALITY OF DEVICES

[75] Inventor: Kenneth S. Reneris, Redmond, Wash.

[73] Assignee: Microsoft Corporation, Redmond, Wash.

[21] Appl. No.: 08/810,018

[22] Filed: Mar. 3, 1997

[51] Int. Cl.⁶ .................................................. G06F 1/32
[52] U.S. Cl. .......................................... 713/324; 713/320
[58] Field of Search ........................ 395/750.01–750.08; 364/707

[56] References Cited

U.S. PATENT DOCUMENTS

| | | | |
|---|---|---|---|
| 4,234,920 | 11/1980 | Van Ness et al. | 395/182.2 |
| 4,907,150 | 3/1990 | Arroyo et al. | 395/750.05 |
| 5,167,024 | 11/1992 | Smith et al. | 395/750.04 |
| 5,230,074 | 7/1993 | Canova, Jr. et al. | 395/182.12 |
| 5,237,692 | 8/1993 | Raasch et al. | 395/740 |
| 5,239,652 | 8/1993 | Seibert et al. | 395/750.05 |
| 5,339,445 | 8/1994 | Gasztonyi | 395/750.06 |
| 5,396,635 | 3/1995 | Fung | 395/750.05 |
| 5,404,544 | 4/1995 | Crayford | 395/750.02 |
| 5,423,045 | 6/1995 | Kannan et al. | 395/750.04 |
| 5,481,730 | 1/1996 | Brown et al. | 395/750.08 |
| 5,483,464 | 1/1996 | Song | 395/750.01 |
| 5,560,024 | 9/1996 | Harper et al. | 395/750.04 |
| 5,579,524 | 11/1996 | Kikinis | 395/750.06 |
| 5,590,342 | 12/1996 | Marisetty | 395/750.06 |
| 5,692,204 | 11/1997 | Rawson et al. | 395/750.08 |
| 5,737,616 | 4/1998 | Watanabe | 395/750.08 |

OTHER PUBLICATIONS

Magic Packet™ Technology, White Paper, Version 1.2, Oct. 20, 1995.

*Primary Examiner*—Glenn A. Auve
*Assistant Examiner*—Sumati Lefkowitz
*Attorney, Agent, or Firm*—Jones & Askew, LLP

[57] ABSTRACT

Sharing a plurality of power resources among a plurality of devices using a set of data structures. Power dependencies are identified using a power management data structure defining which power resources must be on to support the device in a device state and a system state data structure defining which power resources must be off in a corresponding system state. These data structures are used by the operating system where a desired device state for a device is selected. The power management data structure corresponding to the device power state is read to determine which power resources must be on. Only the power resources that must be on are turned on and the power resources that are no longer being used are turned off before placing the device in the desired device power state.

15 Claims, 7 Drawing Sheets

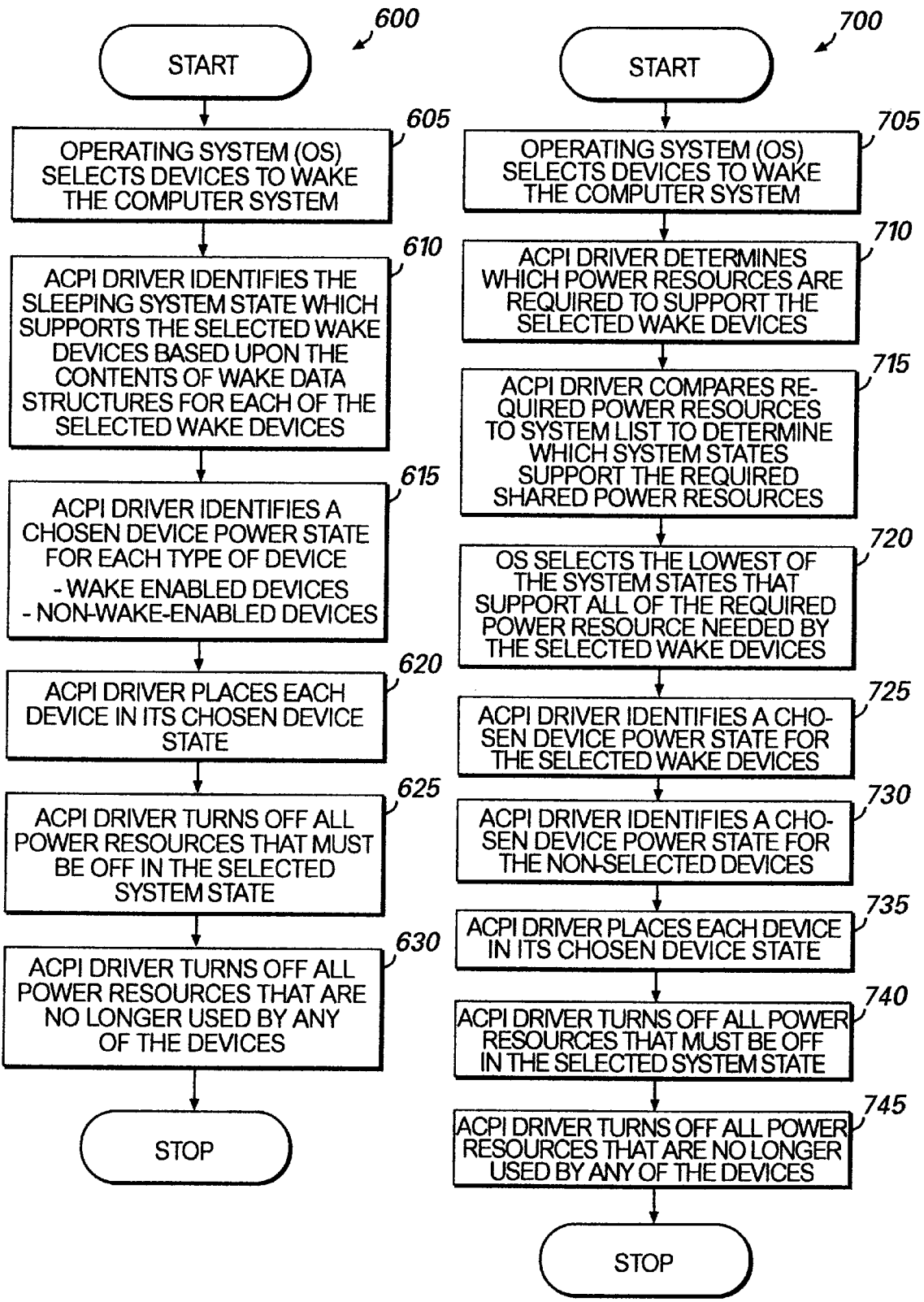

SYSTEM AND METHOD FOR USING DATA STRUCTURES TO SHARE A PLURALITY OF POWER RESOURCES AMONG A PLURALITY OF DEVICES

TECHNICAL FIELD

This invention relates to power management within a computer system, and is more particularly related to a system and method for using a set of data structures to obtain a desired power state in the computer system and to enable a device to wake the computer system from a low power state.

BACKGROUND OF THE INVENTION

Many of the newest and most modem computer systems are designed using a hierarchical hardware device paradigm. Under this paradigm, controllable hardware devices (devices) have physical input/output connectors that are connected to other devices in a hierarchical fashion. In other words, instead of having all devices directly connected to a processor off a single bus, the hierarchically designed computer system has a nesting of devices off of different speed busses within the computer system to optimize the performance of the overall computer system.

Power resources, such as shared power planes that energize devices within the computer system, are typically connected to the devices within the computer in a non-hierarchical fashion. For example, a single power plane may be connected to the processor while simultaneously being connected to an internal modem, a device which is nested below a bus which is ultimately connected to the same processor. The energy provided by such power resources and consumed by the devices within the computer system should be optimized to reduce the overall consumption of energy. Ideally, all devices in a computer system would have their own power resources which would be individually controlled by the operating system to turn off specific devices and minimize power consumed by the computer system as a whole. In this ideal situation, each device would be allocated a whole power resource that is individually controlled for the device.

Implementing such an ideal configuration is not practical due to the aggregate cost of controllable hardware (e.g., switches to turn on and off individual power planes, etc.) for each individual hardware device, particularly for modem portable computer systems. In other words, power resources can be shared by many devices using switching schemes. In this manner, power resources can be connected to groups of devices across the hierarchy of controllable hardware devices in modern portable computer systems. Determining which of the power resources can be turned off to minimize power consumed by the computer system can be difficult because of the relationships between devices and the power resources. Which device needs which power resources? Are any other devices affected if a particular power resource is turned off? How can the power resources be used effectively and efficiently to power only those devices that need to be energized?

One solution may be to turn off all power resources for a particular device in an effort to conserve power consumed by the computer system. However, other devices may also be connected and may need one of the power resources used by the device. Furthermore, some devices may have the capability to wake the computer system in response to a hardware event. If all power resources are removed from the device, the device may not be able to wake the computer system.

In summary, describing the relationship of the non-hierarchical power resources and the hierarchical controllable hardware devices to the operating system can be problematic when trying to manage which power resources must be on or can be turned off in a given situation. Thus, there is a need for a method for (1) identifying the power dependencies of devices within a computer system, (2) managing the power consumed within the computer system, and (3) enabling a device to wake or revive the computer system from a sleeping or low power consumption state.

SUMMARY OF THE PRESENT INVENTION

The present invention satisfies the above-described needs by providing a system and method for managing power consumption in a computer system. In one aspect of the present invention, a computer-readable medium is described on which is stored a computer program for identifying power dependencies within a computer system using a set of data structures. The computer program instructions, when executed, identify a system state data structure related to the computer system. The program instructions further determine which of the power resources must be off by reading the system state data structure. The program instructions further identify a power management data structure related to one of the devices. The program instructions further determine which power resources must be on to support the device in the selected device power state by reading the power management data structure, which preferably defines power management information related to the device.

In this manner, the power resources that must be on to support the device and the power resources that must be off in a given system power state advantageously identify the power dependencies within the computer system. These power dependencies are advantageous because they identify the non-hierarchical relationships between devices themselves and between a device and the computer system and are useful when managing power consumption within the computer system.

In another aspect of the present invention, a method is described for obtaining a desired power state of a device within a computer system. In the method, the power resources that must be on to support the device in the desired device power state are determined by reading a first data structure associated with the device. Each of these determined power resources that are not already turned on are then turned on, typically in a predetermined order. Finally, the device is placed into the desired device power state. Thus, the first data structure is used to obtain a desired power state of the device while advantageously turning on only those power resources necessary and minimizing power consumption within the computer system.

Additionally, the method includes turning off, typically in the predetermined order, each of the power resources no longer being used within the computer system. This is also advantageous because it further minimizes power consumption within the computer system.

Additionally, the method includes updating a list of the power resources in order to track changes in the status of the power resources (the number of devices using each power resource) as if the power resources that must be on have been turned on. In more detail, the step of updating the list typically involves incrementing the status of each of the power resources when that power resource must be turned on for a device and when that power resource was not previously being used by the device. The step of updating the list also typically involves decrementing the status of each of the power resources when that power resource is no longer required by the device and when the power resource was previously used by that device. The list is a useful means of managing and keeping track of multiple devices and how they are using power resources within a computer system.

In another aspect of the present invention, a computer system is provided with devices capable of waking the computer system from a system state. The system has a processor, devices that are connected to the processor, power resources that are connected to the devices, and a memory storage device connected to the processor for storing wake data structures associated with the device. In the computer system, the processor is operative to select one of the devices to wake the computer system, identify the system state which supports the selected device based upon the contents of a wake data structure associated with the selected device, and select a device power state for the selected device within the computer system (preferably based upon the contents in the corresponding wake data structure for the selected device). The processor is further operative to place the selected device within the computer system into a selected device power state and turn off all of the power resources listed in the identified sleeping system state. In this manner, the processor is operative to advantageously enable the device with the capacity to wake the computer system using information contained within the wake data structure.

Additionally, the processor is further operative to turn off all of the power resources that are no longer being used by any of the devices in the computer system. This further enhances the computer system's power management capability.

Additionally, the processor is further operative to determine which of the power resources are required to support the selected device based upon the contents of the wake data structure associated with the selected device. The processor is further operative to compare these power resources to a list of power resources which cannot be turned on corresponding to system states from a set of system states and to select the lowest power consumption of the system states that supports all of the determined power resources required to support the selected device.

These and other advantages of the present invention will be appreciated from studying the following detailed description and drawings, and the appended claims.

BRIEF DESCRIPTION OF THE DRAWINGS

FIG. 6 is a flow diagram illustrating steps of the preferred method for putting a computer system into a sleeping system state while wake-enabling selected devices within the computer system.

FIG. 7 is a flow diagram illustrating more detailed steps of the preferred method for putting a computer system into a sleeping system state while wake-enabling selected devices within the computer system

DETAILED DESCRIPTION

Figure 1:
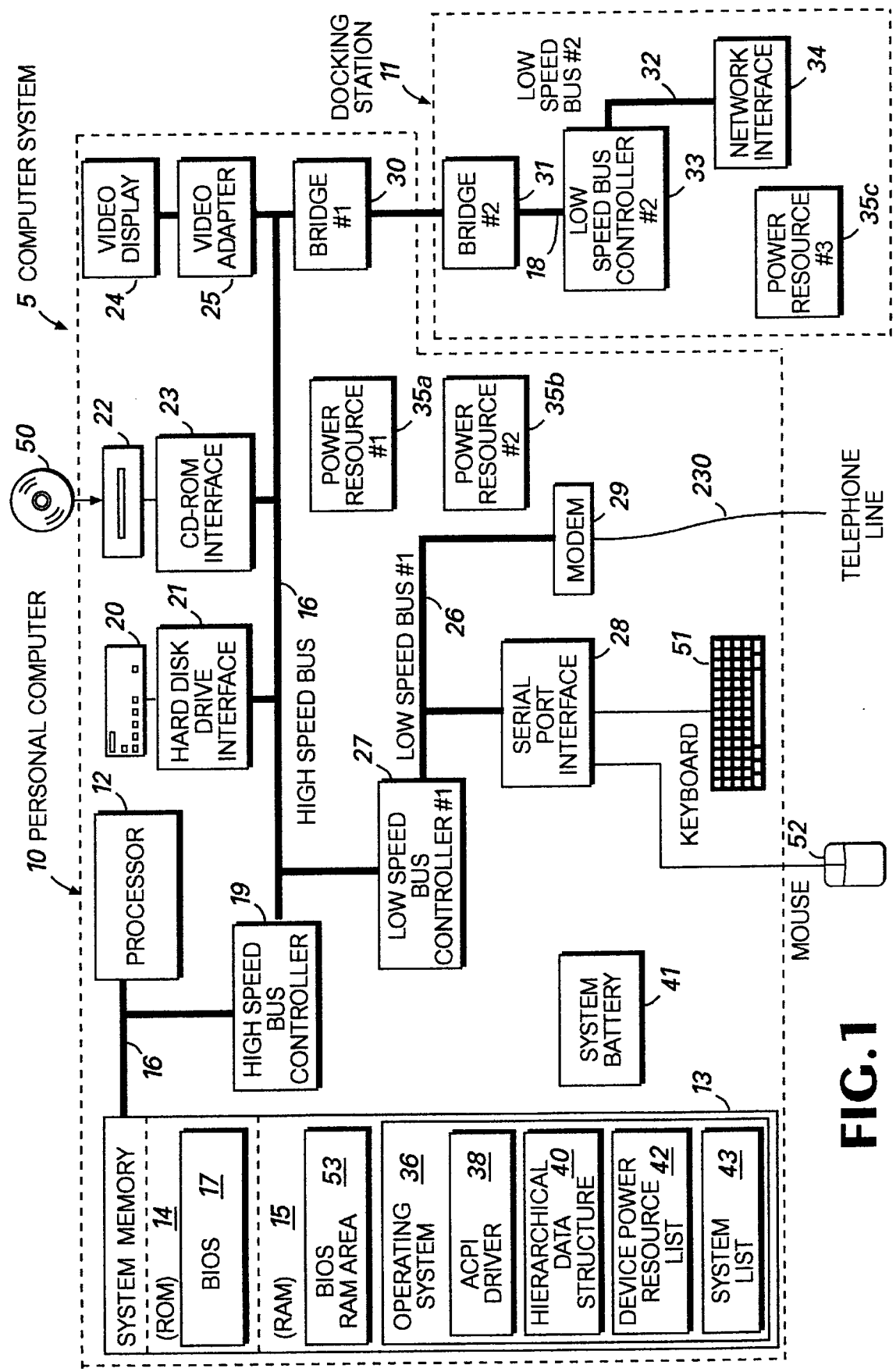
FIG. 1 is a block diagram of a computer system representing the operating environment of an embodiment of the present invention.

The present invention is directed to a system and method for using a set of data structures to identify power dependencies in a computer system, to obtain a desired power state in the computer system, and to enable a device within the computer system to wake the computer system. In general, the data structures identify or define device-level power dependencies and system-level power dependencies. More particularly, a power management data structure defines which power resources must be on to maintain a particular device in a given device power state. Device power states are predetermined with varying levels of functionality and power consumption. On the other hand, a system state data structure defines which power resources must be off to maintain the computer system in a system power state. System power states are also predetermined with varying levels of functionality and power consumption. The computer system uses these two specialized data structures to identify and track which power resources are needed and not needed in order to minimize power consumption within the computer system. Furthermore, a wake data structure associated with a device is used to define which of the power resources within the computer system must be on so that the device can be enabled to wake the computer system from a sleeping system power state.

The preferred embodiment of the present invention uses a modified version of the "WINDOWS NT" operating system, developed and marketed by Microsoft Corporation of Redmond, Washington. The present invention will also be embodied within future versions of the "WINDOWS 95" operating system, developed and marketed by Microsoft Corporation. Although the preferred embodiment will be generally described in the context of controllable hardware devices, power resources, and an operating system running on a personal computer, those skilled in the art will recognize that the present invention also can be implemented in conjunction with other program modules for other types of computers.

The detailed description which follows is represented largely in terms of processes and symbolic representations of operations by conventional computer controlled hardware devices. A "controlled hardware device" or device is a term used to refer to any computer subsystem or peripheral that may be connected to a computer and controlled by its processor. Examples of such devices include, but are not limited to, memory storage devices, connected video display devices, network interfaces, modems, and input devices. One such device is a "power resource" or "shared power resource" which supports other devices and can be shared among the other devices. Examples of such power resources include, but are not limited to, shared power planes which deliver energy (voltage and current) to electrically power devices, shared isolation buffers which isolate and protect multiple devices that are interconnected, and shared clock sources which provide common timing signals to different devices.

The processes and operations performed by the computer include the manipulation of signals by a processor and the maintenance of these signals within data structures resident in one or more memory storage devices. A "data structure" is defined as imposing a physical organization upon a collection of data stored within a memory storage device and represents specific electrical or magnetic elements. An example of such a data structure is a conventional software object that encapsulates data. In one embodiment of the present invention, a "hierarchical data structure" or HDS is created having other specialized data structures (e.g., power management data structure, wake data structures, and system state data structures) organized into nodes of a hierarchy. Symbolic representations of such data structures are the means used by those skilled in the art of computer programming and computer engineering to most effectively convey teachings and discoveries to others skilled in the art.

For the purposes of this discussion, a process or method is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, information, elements, symbols, characters, numbers, records, blocks, entries, objects, files, data structures, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as adding, comparing, reading, searching, placing, identifying, determining, displaying, setting, etc. which are often associated with manual operations performed by a human operator. The operations described herein are machine operations performed in conjunction with various input provided by a human operator or user that interacts with the computer.

In addition, it should be understood that the operating system, drivers, program modules, processes, methods, etc. described herein are not related or limited to any particular computer or apparatus, nor are they related or limited to any particular communication architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and the preferred operating environment will be described.

The Operating Environment

FIG. 1 illustrates various aspects of the preferred computing environment in which an illustrative embodiment of the present invention is designed to operate. Those skilled in the art will immediately appreciate that FIG. 1 and the associated discussion are intended to provide a brief, general description of the preferred computer hardware and software modules, and that additional information is readily available in the appropriate programming manuals, user's guides, and similar publications.

FIG. 1 illustrates a computer system 5, comprising a portable personal computer 10 and a docking station 11, designed under the hierarchical device paradigm and is suitable for supporting the operation of an embodiment of the present invention. As shown in FIG. 1, the personal computer 10 includes a processor 12, preferably the "PENTIUM" family of microprocessors manufactured by the Intel Corporation of Santa Clara, Calif. However, it should be understood that the invention can be implemented on computers based upon other microprocessors, such as the "MIPS" family of microprocessors from the Silicon Graphics Corporation, the "POWERPC" family of microprocessors from both the Motorola Corporation and the IBM Corporation, the "PRECISION ARCHITECTURE" family of microprocessors from the Hewlett-Packard Company, the "SPARC" family of microprocessors from the Sun Microsystems Corporation, or the "ALPHA" family of microprocessors from the Digital Equipment Corporation.

The personal computer 10 also includes system memory 13 (including read only memory (ROM) 14 and random access memory (RAM) 15), which is connected to the processor 12 by a processor data/address bus 16. The BIOS 17 for the personal computer 10 is stored in ROM 14 and is loaded into a BIOS area 53 of RAM 15 upon booting. Those skilled in the art will recognize that the BIOS 17 is a set of basic executable routines that have conventionally helped to transfer information between elements within the personal computer 10.

Within the personal computer 10, a high speed bus 18 is connected to a high speed bus controller 19 and the processor data/address bus 16. In one embodiment, the high speed bus 18 is implemented as a standard Peripheral Component Interconnect (PCI) bus although other standardized bus architectures may be used, such as the Extended Industry Standard Architecture (EISA) bus. The high speed bus controller 19 examines all signals from the processor 12 to route the signals to the appropriate bus. Signals between the processor 12 and the system memory 13 are merely passed through the high speed bus controller 19. However, signals from the processor 12 intended for devices other than system memory 13 are routed onto the high speed bus 18, another level in the hierarchical design of the computer system 5.

Various devices are connected to the high speed bus 18. A hard disk drive 20 is connected to the high speed bus 18 via a hard disk drive interface 21. A CD-ROM drive 22, which is used to read a CD-ROM disk 50, is connected to the high speed bus 18 via a CD-ROM interface 23. The video display 24 or other kind of display device is connected to the high speed bus 18 via a video adapter 25.

A first low speed bus 26 is connected to the high speed bus 18 by a first low speed bus controller 27. The first low speed bus 26 is generally of lesser or equal speed when compared to that of the high speed bus 18. In the one embodiment, the first low speed bus 26 is implemented as an Industry Standard Architecture (ISA) bus although other standardized bus architectures may be used.

A user enters commands and information into the personal computer 10 by using a keyboard 51 and/or pointing device, such as a mouse 52, which are connected to the first low speed bus 26 via a serial port interface 28. Other types of pointing devices (not shown in FIG. 1) include track pads, track balls, joy sticks, data gloves, head trackers, and other devices suitable for positioning a cursor on the video display 24.

As shown in FIG. 1, the personal computer 10 also includes a modem 29. Typically, the modem 29 is connected to a telephone line 230. The modem 29 is preferably internal to the personal computer 10 and is connected directly to the first low speed bus 26. Although illustrated in FIG. 1 as internal to the personal computer 10, those of ordinary skill in the art will quickly recognize that the modem 29 may also be external to the personal computer 10. The modem 29 is typically used to communicate over wide area networks (not shown), such as the global Internet.

As shown in FIG. 1, a first bridge 30 is connected to the high speed bus 18. The first bridge 30 connects to a second bridge 31, which is part of the docking station 11, when the user "docks" the personal computer 10 into the docking station 11. In this manner, devices in the docking station 11 become part of the personal computer 10 and capable of being controlled by the processor 12.

Within the docking station 11, a second low speed bus 32 is connected to the high speed bus 18 by a second low speed bus controller 33. Similar to the first low speed bus 26, the second low speed bus 32 is generally of less or equal speed when compared to that of the high speed bus 18. In one embodiment the second low speed bus 32 is preferably implemented as an ISA bus although other standardized bus architectures may be used. A network interface 34 is connected to the second low speed bus 32 in the docking station 11. The network interface 34 is used for connecting to other computers via local area networks (not shown). Those skilled in the art will appreciate that other buses (not shown) may be present in the docking station 11 and that the network interface 34 may be capable of communicating with the processor 12 over a higher speed bus (such as a PCI bus) rather than the second low speed bus 32. However, the illustrated buses (the high speed bus 18 and the second low speed bus 32) are used exemplary embodiments to support the present invention.

Devices 19–34 in the personal computer 10 and in the docking station 11 are supported by controllable power resources 35a–c. Each power resource 35a–c is basically a shared supply or resource within a computer system 5, such as a shared power plane, a shared isolation buffer, or a shared clock supply. In order to simplify the discussion of the present invention, the discussion below uses shared power planes as an example of a power resource. However, it is important to note that the present invention is not limited to this specific type of power resource. Essentially any kind of power resource that supports one or more devices within the computer system 5 can be used with the present invention.

Generally, the power resources of the computer system 5 are shared amongst each device within the computer system 5. This allows for an economical means for routing energy from a system battery 41 only where it is needed and for controlling power consumption. For example, power resource #1 35a is a shared power plane capable of providing voltage and current to a number of devices in the computer system. Power resource #2 35b and power resource #3 35c are other shared power planes also connected to a number of device in the computer system 5. Devices may be advantageously connected to one or more of the power resources 35a–c whereby which power resource 35a–c to have on will depend upon which of the devices depend on that particular power resource in their current mode of operation.

The power resources 35a–c shown in FIG. 1 are merely illustrative because it is contemplated that there are other power resources throughout the computer system 5 that are not shown to avoid confusion. Accordingly, additional details concerning the internal construction of the personal computer 10 and the docking station 11 need not be disclosed in connection with the present invention.

Those skilled in the art will understand that software modules and data are provided to the personal computer 10 via one of the memory storage devices or computer-readable media, which may include the hard disk drive 20, floppy disk (not shown), CD-ROM 50, RAM 15, ROM 14, and digital tapes (not shown). In the preferred embodiment, these software modules include an operating system 36 which has an Advanced Configuration and Power Interface (ACPI) driver 38. The ACPI driver 38 is a software module that implements configuration and power management aspects of the operating system 36. In the preferred embodiment, the hard disk drive 20 may be used to store these software modules once they are installed from a CD-ROM 26. A hierarchical data structure (HDS) 40 is another software module preferably created in RAM 15 when the computer system 5 boots up and is preferably maintained in system memory 13. Software modules may also include files or data structures created during run-time operations of the computer system 5, such as the Device Power Resource List 42 and the System List 43.

A Basic Input/Output System (BIOS) 17 is stored in the ROM 14 (which is later loaded into a BIOS area 53 of RAM 15) and provides low-level service routines executable by the operating system 36 or other software modules. Conventionally, the BIOS 17 has provided these service routines to give access to the devices within the computer system. As power management has evolved and become more complex, the amount of information and tasks imposed upon traditional ROM-based BIOS 17 has vastly increased. In the preferred embodiment of the present invention, the BIOS 17 has been simplified because the operating system 36 unifies the power management process and executes control methods to interact with the devices and power resources 35a–c on a low-level.

In general, the operating system 36 interprets and carries out instructions issued by the user. For example, when the user wants to load a software module, the operating system 36 interprets the instruction and causes the processor 12 to load the software module into RAM 15 from either the hard disk drive 20 or the CD-ROM 50. Once the software module is loaded into the RAM 15, it can be used by the processor 12. In case of large software modules, the processor 12 loads various portions of program modules into RAM 15 as needed.

As previously mentioned, the preferred embodiment of the present invention is the operating system 36 that creates and uses particular sets of data structures stored within the HDS 40 in RAM 15. These data structures are preferably used by a modified version of the "WINDOWS NT" operating system adhering to an Advanced Configuration and Power Interface (ACPI) Specification for power management. However, it should be understood that the invention can be implemented for use with other operating systems including, but not limited to, Microsoft Corporation's "WINDOWS 3.1" and "WINDOWS 95" operating systems, IBM Corporation's "OS/2" operating system, and the operating system used in "MACINTOSH" computers manufactured by Apple Computer, Inc.

It should be appreciated that operating systems, such as the "WINDOWS NT" operating system, are quite complex and provide a wide variety of services that allow users and programs to utilize the resources available in the personal computer. Those skilled in the art will be familiar with operating systems and their various features. For more comprehensive information regarding the "WINDOWS NT" operating system, the reader may refer to any of a variety of publications, including the "Inside Windows NT", published by Microsoft Press.

Figure 2:
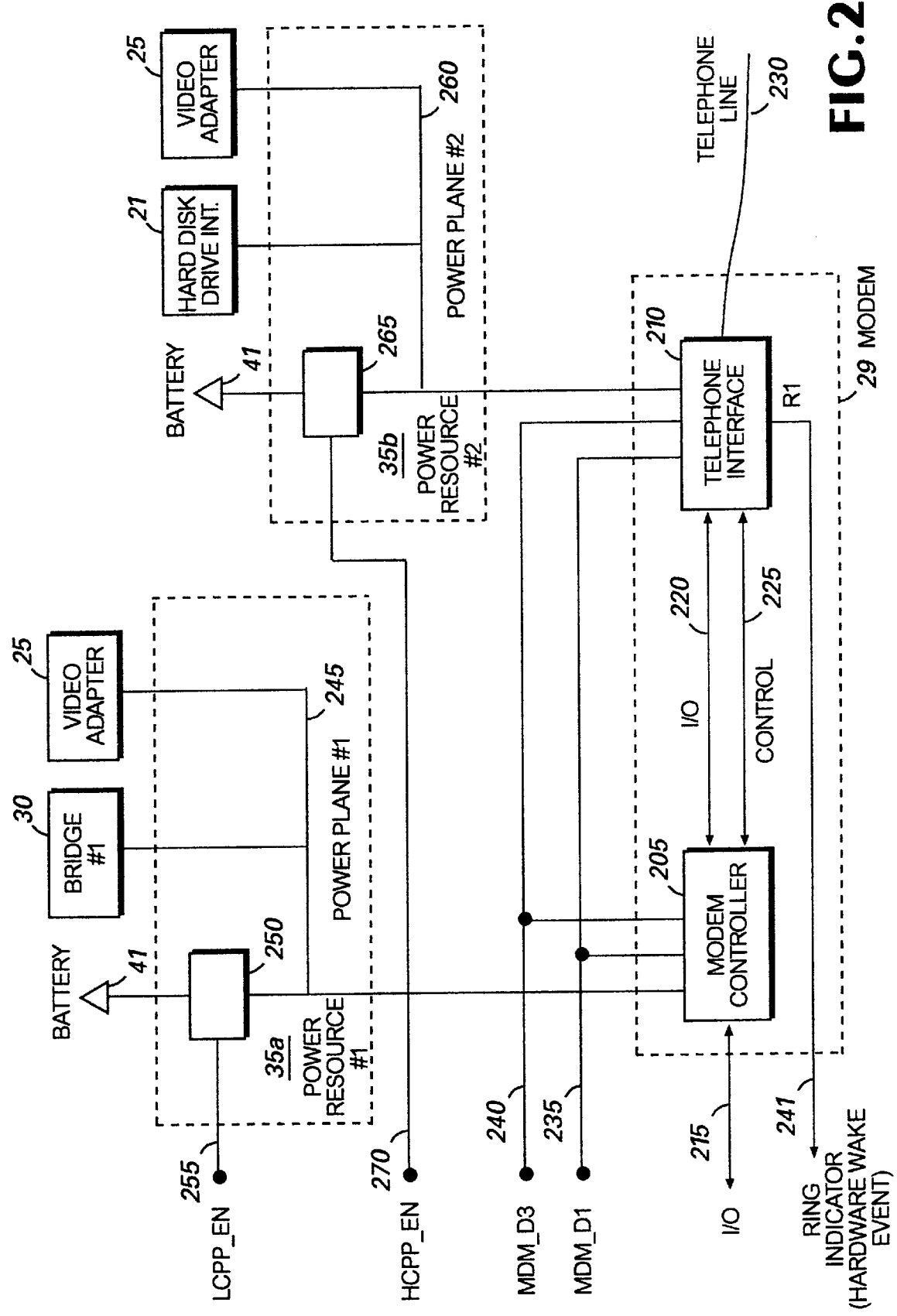
FIG. 2 is a block diagram of a modem and power resources connected to the modem from the operating environment of an embodiment of the present invention.

To illustrate the connections between a device and a power resource, a more detailed illustration of the modem 29 is shown in FIG. 2. FIG. 2 is a block diagram of a simplified modem 29 and the power resources 35a–b connected to the simplified modem 29 from the operating environment of an embodiment of the present invention. Although modems in general are more complex, the illustrated modem 29 has been simplified in order to avoid confusion when describing embodiments of the present invention.

Referring now to FIGS. 1 and 2, the simplified modem 29 comprises different parts, such as a modem controller 205 and a telephone interface 210. The modem controller 205 has input/output (I/O) connections 215 and control lines (MDM_D1 235 and MDM_D3 240) which are connected to the first low speed bus 26. The MDM_D1 line 235 and the MDM_D3 line 240 are control lines connected to the modem controller 205 and the telephone interface 210. These control lines 235, 240 allow the operating system 36 to place the modem 29 in different device power states. For example, the MDM_D1 line 235 is preferably used to place the modem 29 in a low power consumption state called a D1 state. The MDM_D3 line 240 is preferably used to place the modem 29 in another lower power consumption state called a D3 state. Device power states such as D1 and D3 are discussed in greater detail below with regard to FIG. 5.

Between the modem controller 205 and the telephone interface 210 are internal I/O lines 220 and internal control lines 225. A telephone line 230 is conventionally connected to the telephone interface 210. The telephone interface 210 asserts a ring indicator (RI) line 241 when the telephone interface 210 detects a ring on the telephone line 230. The ring indicator line 241 provides notification of a hardware wake event that can be used to wake the computer system 5. In this manner, the modem 29 provides the computer system 5 with the ability to communicate with other remote computer systems and with the ability to wake the computer system 5.

The modem 29 is powered by two power resources (power resource #1 35a and power resource #2 35b). The power resource #1 35a is a power plane #1 245 that is energized on or off by a first switch 250 controlled by a LCPP_EN line 255. The power plane #1 245 is essentially a distribution network connected to other devices (such as the first bridge 30 and the video adapter 25) for distributing electrical energy from the system battery 41. Similarly, the power resource #2 35b is a power plane #2 260 that is energized on or off by a second switch 265 controlled by a HCPP_EN line 270. The power plane #2 260 is also a distribution network connected to other devices (such as the hard disk drive interface 21 and the video adapter 25) for distributing electrical energy from the system battery 41. Thus, power resources are illustrated supporting a device within the computer system 5.

Figure 3:
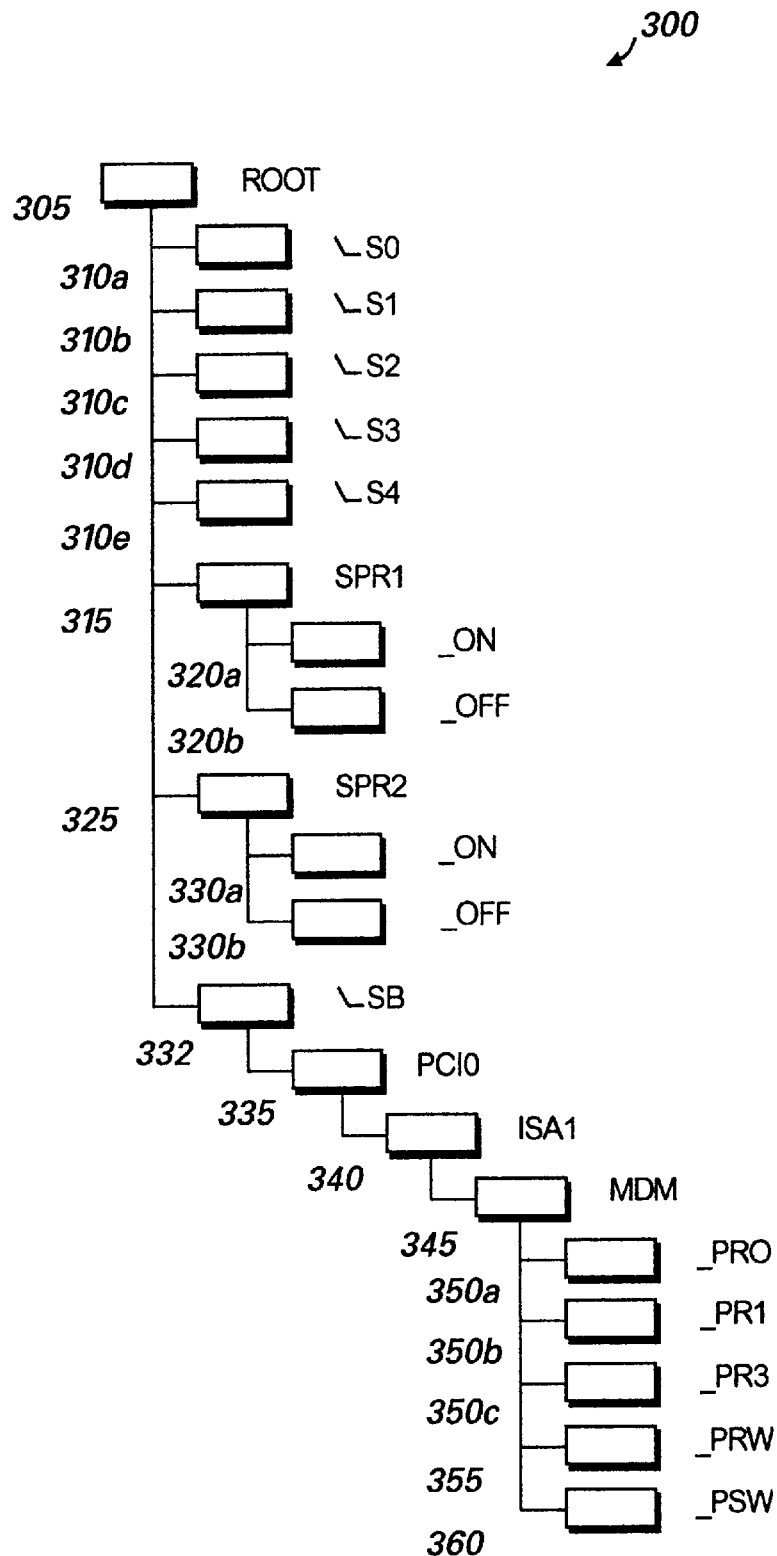
FIG. 3 is a diagram illustrating the contents of a hierarchical data structure as objects and specialized data structures within a hierarchy.

In the preferred embodiment, the LCPP_EN line 255 and the HCPP_EN line 270 are essentially controllable bits which can correspond to almost any spare addressable pins within the computer system 5, preferably within a bit field of the addressable hardware control registers and input/output (I/O) space 340 (FIG. 3). The BIOS 17 in association with the ACPI driver 38 create a hierarchical data structure (the HDS 40) that, in addition to other functions, provides information about these controllable bits to the operating system 36. More particularly, the HDS 40 indicates which bits are associated with which power planes, how to access these bits, and how to sequence the bits in a way that will turn a device's power on or off.

The Hierarchical Data Structure

In general, software modules (such as tables or definition blocks) are used to describe system information, features, and methods of controlling those features by the original equipment manufacturer (OEM) who designed the computer hardware. These software modules are used when the personal computer 10 is initially booted using the BIOS 17. During this booting process, the HDS 40 is created in dynamic memory, such as RAM 13. In the preferred embodiment, the HDS 40 is also referred to as an Advanced Configuration and Power Interface (ACPI) Namespace.

On a fundamental level, the HDS 40 generally contains device objects (also known as bus/package objects), data objects, and control method objects. A device object is a data structure that represents and identifies one of the controllable hardware devices in the computer system 5. The relative locations of device objects within the HDS 40 represent how the devices are physically connected to each other within the computer system 5. In one embodiment of the present invention, there is a special type of data structure called a power resource object, that is similar to a device object. Power resource objects represent power resources 35a–c within the computer system 5. However, the relative locations of power resource objects within the HDS 40 do not represent how the power resources 35a–c are physically connected to devices in the computer system 5. Power resource objects are discussed further below with regard to FIG. 5.

A data object is a data structure that contains information about a device associated with the data object. Typically, the device object (corresponding to the associated device) and the data object have a parent/child relationship. Those skilled in the art will be familiar with parent/child relationships in software objects and object-oriented environments. One special type of data object is a power management data structure (also called a power management object). Power management data structures describe power management information associated with a particular device. However, other special types of data objects, such as system state data structures, are not child objects. These special types of data objects contain higher level information related to the entire computer system 5 rather than any particular device. Power management data structures and system state data structures are discussed further below with regard to FIG. 3.

Finally, a control method object is a data structure that generally provides a mechanism for the operating system 36 to perform precise system-level hardware tasks with a device without the need to call a routine from the BIOS 17. The control method object is typically a package object containing a series of object references that collectively represent a control method. Control method objects can advantageously reference or invoke other control method objects, thus providing a level of abstraction and portability.

In the preferred embodiment, control methods are written in a pseudocode language (p-code), which is analogous to a "virtual" machine-level assembly language for controlling the hardware devices of the system. Pseudocode is any informal language construct or notation that can be interpreted and executed by a software interpreter. It is important to note that the actual pseudocode used to implement the preferred embodiment is arbitrarily chosen. One skilled in the art will realize that any pseudocode language that performs the appropriate associated function, i.e., references each of the desired objects to implement a control method, will fully implement this feature of the present invention.

The control methods are interpreted by part of the operating system 36, i.e., the ACPI driver 38. Once interpreted, access to the actual device or power resource 35a–c is accomplished by reading and writing to a special data object (operational region) representing a controllable element of the device, such as a control register or I/O space of the device, or a bit controlling a power resource 35a–c. These operational regions provide an abstract, yet precise access down to the actual bit level, depending on how the special data object is defined. In this manner, the operating system 36 is allowed to interact with controllable hardware devices or power resources 35a–c on a low-level without having to rely on prior intimate knowledge of the system hardware devices or on supplied routines from the BIOS 17.

Specialized Data Structures in the Hierarchical Data Structure Used for Power Management Given this brief preface on the basic kinds of objects or data structures maintained within the HDS 40, several specialized data structures (such as power management data structures, wake data structures, and system state data structures) are also maintained within the HDS 40. These specialized data structures are used in an embodiment of the invention to identify power dependencies, to obtain a desired power state of the device, and to enable the device to wake the computer system 5. FIG. 3 is a diagram symbolically illustrating the contents of the HDS 40, which includes these specialized data structures, such as power management data structures, system state data structures, and wake data structures, used in an illustrative embodiment of the present invention.

Referring now to FIGS. 1, 2, and 3, an illustrative portion of the contents 300 of the HDS 40 that is used for power management of the computer system 5 are illustrated. A root object 305 is positioned at the highest level within the HDS 40. Essentially the root object 305 is a device package object associated with the entire computer system 5. The root object 305 forms the highest object within the HDS 40.

On the level immediately below the root object 305, there is a first power resource object (SPR1) 315 that represents and identifies power resource #1 35a (containing the power plane #1 245). The first power resource object 315 has two related control method objects 320a–b that are child objects. The "_ON" control method object 320a turns on power resource #1 35a by asserting the bit controlling the LCPP_EN line 255 while the "_OFF" control method object 320b turns off power resource #1 35a.

There is also a second power resource object (SPR2) 325 that represents and identifies power resource #2 35b (containing the power plane #2 260). Similar to the first power resource object 315, the second power resource object 325 has two related control method objects 330a–b to turn on and off, respectively, power resource #2 35b by toggling the bit controlling the HCPP_EN line 270. Thus, these power resource objects and their associated control method objects are used when the operating system 36 (via the ACPI driver 38) desires to turn on or off one of the power resources in the computer system 5.

A processor bus object (\_SB) 332 is also stored on the level immediately below the root object 305 in the illustrative embodiment. The processor bus object 332 represents the processor data/address bus 16. Those skilled in the art will appreciate that each of the controllable devices in the computer system 5 are hierarchically connected to the processor data/address bus 16. Accordingly, each of the controllable devices in the computer system 5 are represented within the HDS 40 as objects hierarchically related to the processor bus object 332.

A high speed bus controller device object (PCIO) 335 is stored on the level immediately below the processor bus object 332 in the illustrative embodiment. The high speed bus controller device object (PCIO) 335 represents the high speed bus controller 19.

A first low speed bus controller device object (ISA1) 340 is connected to the high speed bus controller device object (PCIO) 335 in the hierarchy of the HDS 40. The first low speed bus controller device object (ISA1) 340 represents the first low speed bus controller 27 that is physically connected in a hierarchical fashion to the high speed bus controller 19 via the high speed bus 18.

A modem device object (MDM) 345 is connected to the first low speed bus controller device object (ISA1) 340 in the hierarchy of the HDS 40. The modem device object (MDM) 345 represents the modem 29 that is physically connected in a hierarchical fashion to the first low speed bus controller 27 via the first low speed bus 26. In this manner, device objects (such as PCIO 335, ISA1 340, and MDM 345) identify and represent devices within the computer system 5 to the operating system 36.

As previously mentioned, power management data structures are specialized kinds of data objects stored within the HDS 40 that describe power management information associated with a particular device. More particularly, a power management data structure preferably contains a list of power resources within the computer system 5 that must be turned on to support the particular device in a device power state.

A device power state essentially defines the power consumption and power requirements of the particular device in that particular device power state. These device power states are not generally visible to the user of a computer system 5. For example, some devices may be in the off state even though the computer system 5 as a whole is in the working or "fully on" state. Device power states are preferably defined in terms of certain criteria: power consumption, device context, and restore time. In other words, the device power state defines how much power the device consumes, how much information stored in volatile memory within the device (device context) is retained, and how long it takes to restore the device to the "fully on" state.

In the preferred embodiment, there are four predefined device power states (D0–D3). D0 is the "fully on" state of a device with the highest level of power consumption. The particular device is fully operational, completely active, and responsive in the D0 device power state. Device context is fully retained in the D0 device power state.

The D1–D3 device power states are lower power consumption states when compared to the D0 device power state. D1 is a device power state for the particular device that saves more power than D0 and preserves less device context than D0. D2 is a device power state that saves more power than D1 and D0 and preserves less device context than either D0 or D1. Typically, D1 and D2 device power states may be referred to as the "standby" and "suspend" states and are defined by each class of device, such as hard disk drives 20 or modems 29. D3 is the "fully off" power state of the particular device where all power is removed and the device context is lost upon entering this state. The operating system 36 must reinitialize the particular device when powering it back on from the D3 device power state. Accordingly, devices in the D3 device power state have the longest restore time.

A series of power management data structures 350a–c associated with the modem device object 345 are also illustrated in FIG. 3. Typically, a particular device will have several power management device objects corresponding to the different device power states defined for the particular device. For example, the power management data structures 350a–c correspond to different device power states of the modem 29.

Each of the power management data structures 350a–c preferably identifies (1) which power resources 35a–c must be on in a corresponding device power state and (2) a minimum system power state that will support the device in the corresponding device power state. System power states are similar to device power states, but on a system level. System power states vary from a fully on or working state to various power saving "sleeping" system states where predetermined power resources must be turned off. The above-mentioned minimum system power state is the lowest system power state where none of the identified power resources are power resources that must be turned off in the particular power state.

In the illustrative case of the modem 29, the "_PR0" power management data structure 350a contains such information while corresponding to a D0 device power state for the modem 29. The "_PR1" power management data structure 350b also contains such information while corresponding to a D1 device power state for the modem 29. Finally, the "_PR3" power management data structure 350c also contains such information while corresponding to a D3 device power state for the modem 29. Those skilled in the art will appreciate that not all devices will define each of the possible device power states (D0–D3), depending upon the complexity of the device. For example, simple devices may only be able to support the fully-on (D0) or fully-off (D3) device power state while more complex devices may be able to vary the amount of power consumed while retaining a variable amount of device context, thus supporting other low power consumption device power states, such as D1 or D2. In summary, power management data structures are data structures used to identify which power resources 35a–c in the computer system 5 must be on to support an associated device in one of the predefined device power states. These data structures advantageously describe some of the device-level power dependencies within the computer system 5.

Another special data object maintained as a child object associated with a particular device is a wake data structure. The wake data structure is preferably used by the operating system 36 (via the ACPI driver 38) to enable the particular device to wake the computer system 5 from a sleeping system power state. For example, a "_PRW" wake data structure 355 is associated with the modem 29 and is used by the operating system 36 to enable the modem 29 to wake the computer system 5 from a sleeping or low power consumption system power state. Essentially, the wake data structure describes an enable bit, a minimum system power state, and a list of power resources required to wake the computer system.

In the preferred embodiment, a wake data structure, such as the "_PRW" wake data structure 355, contains a description of the enable bit for the particular device. The "_PRW" wake data structure 355 also includes a reference to a minimum system power state associated with the particular device that will support the particular device's capacity to wake the computer system 5. In other words, if the current system power state is lower than this defined minimum system power state for waking the computer system 5, then the particular device will not be able to wake the computer system 5 from a "sleeping" system power state. Finally, the "_PRW" wake data structure also includes the list of which power resources 35a–c in the computer system 5 must be on to support an associated device in one of the predefined device power states. Thus, all of these listed power resources 35a–c must be on for the particular device, such as the modem 29, to be able to sense power management wake events, such as when a telephone call is received, and to respond to the sensed wake event.

A special control method object, called a wake enable control method object, is also maintained as a child object associated with a particular device in the HDS 40. The wake enable control method object is preferably called by the operating system 36 (via the ACPI driver 38) when setting the enable bit associated with the particular device. For example, a "_PSW" wake enable control method object 360 is illustrated in FIG. 3 that is associated with the modem 29. The "_PSW" wake enable control method object 360 is called by the operating system 36 to actually set the enable bit for the modem 29 indexed within the GP_EN register. This would enable any power management or hardware wake events reported by the modem 29 on the ring indicator line 241 to wake the computer system 5 from a sleeping system state.

Another of the specialized data structures maintained within the HDS 40 is a system state data structure that contains information on different predefined system power states for the computer system 5 as a whole. As previously mentioned, a system power state defines which of the power resources 35a–c must be off when the computer system 5 is in that particular system power state. The set of system power states for a computer system 5 has states that vary from a fully on or working state to various power saving "sleeping" system states. In the preferred embodiment, the predefined system power states are designated as S0–S4, with S0 being the "working" state and S1–S3 are "sleeping" states where an increasing number of the power resources 35a–c are required to be off to support logically lower system power states (S0 being the highest & S4 being the lowest). S4 is the system power state where all power resources 35a–c are off. The information defining each of these system power states (S0, S1, S2, S3, and S4) is stored in corresponding system state data structures, such as "\_S0" 510a, "\_S1" 510b, "\_S2" 510c, "\_S3" 510d, and "\_S4" 510e, respectively.

In more particular detail, S0 is preferably the fully on or working state of the computer system 5 where RAM 15 is accessible by the processor 12 and the devices are individually managed by the ACPI driver 38 within the operating system 36. The power resources 35a–c are in a state that is compatible with the current device power state for each of the devices.

In the preferred embodiment, S1 is called a low wake-up latency sleeping system power state of the computer system 5 where the processor 12 is halted and is no longer executing instructions. However, bits of volatile information within the processor 12 (processing context) and RAM 15 are maintained in S1. Specific power resources defined by the S1 system power state and referenced in a system state data structure, such as the "\_S1" system state data structure 310b, must be turned off. Only devices in a particular device power state, which references power resources that can be on in S1, can be in that particular device power state. Devices which are enabled to wake the computer system 5 from the S1 state and that can do so from their current device power state may initiate a hardware wake event that transitions the computer system 5 from the S1 state to the S0 state. In this transition, the processor 12 preferably restarts execution from the instruction where it halted.

In the preferred embodiment, S2 is also called a low wake-up latency sleeping system power state of the computer system 5 similar to S1, except processing context is lost. Specific power resources listed by the S2 system power state and referenced by a corresponding system state data structure, such as the "\_S2" system state data structure 310c, are turned off. Only devices in a particular device power state, which references power resources that can be on in S2, can be in that particular device power state. Devices which are enabled to wake the computer system 5 from the S2 state and that can do so from their current device power state may initiate a hardware wake event that transitions the computer system 5 from the S2 state to the S0 state. In this transition, the processor 12 preferably restarts execution from a waking vector stored in a predetermined memory location. In the preferred embodiment, the waking vector is a real-mode Wake vector address used by the BIOS 17 upon waking the system. The BIOS 17 starts executing instructions starting from this waking vector when waking from the S2 state. The predetermined memory location is a predetermined memory location where the operating system 36 (via the ACPI driver 38) stores the waking vector.

In the preferred embodiment, S3 is called a low wake-up latency sleeping system power state of the computer system 5 where all system context is lost except for RAM 15. All bits of volatile information within each of the devices (device context) are lost in this state. Specific power resources listed by the S3 system power state and referenced by a corresponding system state data structure, such as the "\_S3" system state data structure 310d, are turned off. Only devices in a particular device power state, which references power resources that can be on in S3, can be in that particular device power state. Devices which are enabled to wake the computer system 5 from the S3 state and that can do so from their current device power state may initiate a hardware wake event which transitions the computer system 5 from the S3 state to the S0 state. In this transition, the processor 12 preferably restarts execution from a waking vector stored similar to waking from the S2 state.

In the preferred embodiment, S4 is called a system hardware context lost power state of the computer system 5 where all system context, device context, processor context, and dynamic memory, such as RAM 15, is lost. Essentially, this state is a "soft off" state for the computer system 5. All power resources are listed by the S4 system power state and referenced by a corresponding system state data structure, such as the "\_S4" system state data structure 310e, and are all off. In other words, all devices are in their D3 device power states. Devices which are enabled to wake the computer system 5 from the S4 state and that can do so from their D3 device power state may initiate a hardware wake event which transitions the computer system 5 from the S4 state to the S0 state.

Once created within the HDS 40, the power management data structures 350a–c and the system state data structures 310a–e are used, preferably by the operating system 36, to identify the power dependencies of devices and to obtain a desired power state of devices within a computer system 5. In other words, these specialized data structures are advantageously used to collectively identify power dependencies and to efficiently manage power consumption of each device and of the computer system 5 as a whole.

Figure 4:
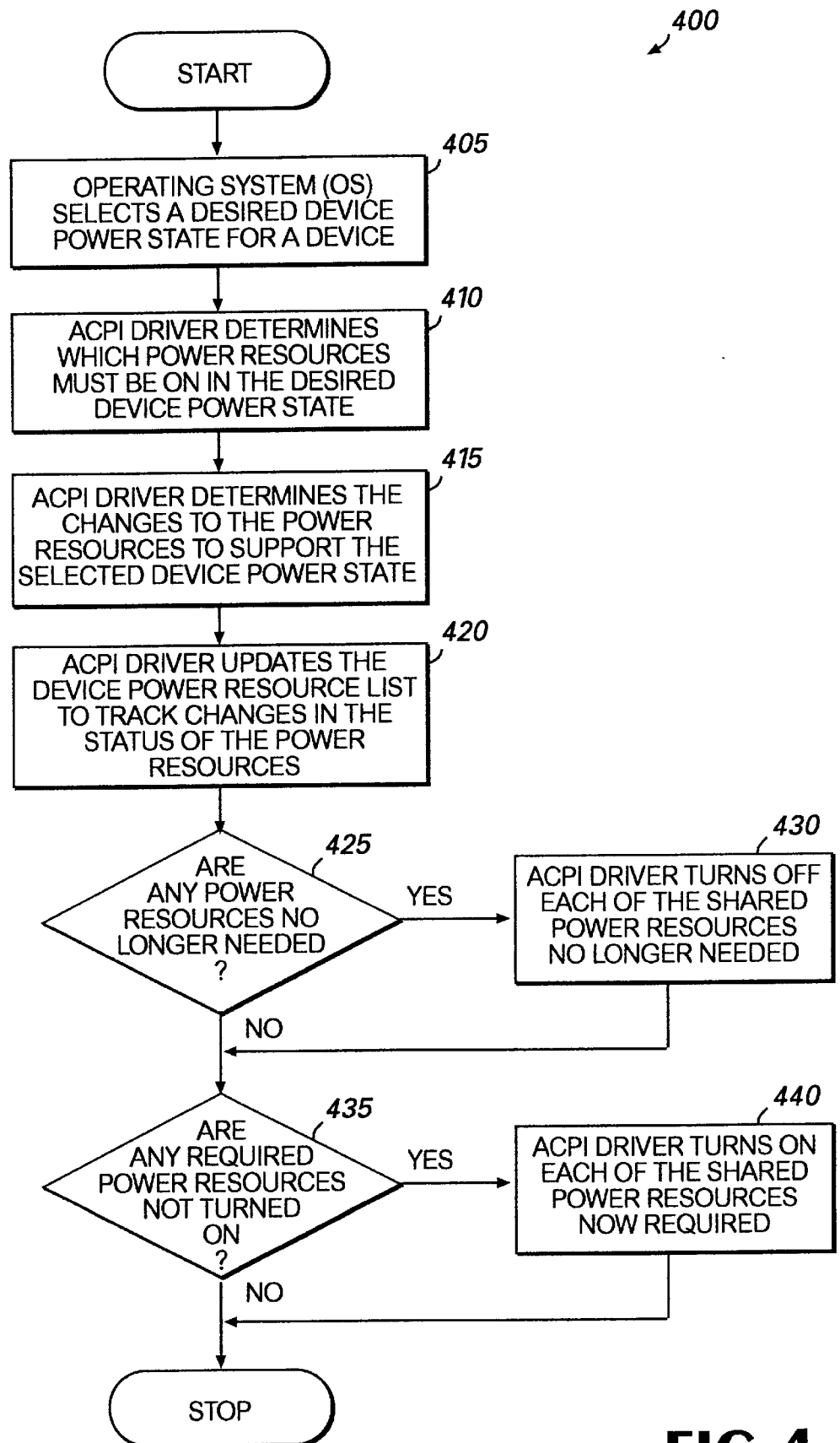
FIG. 4 is a flow diagram illustrating steps of the preferred method for obtaining a desired power state of a device in a computer system.
Figure 5:
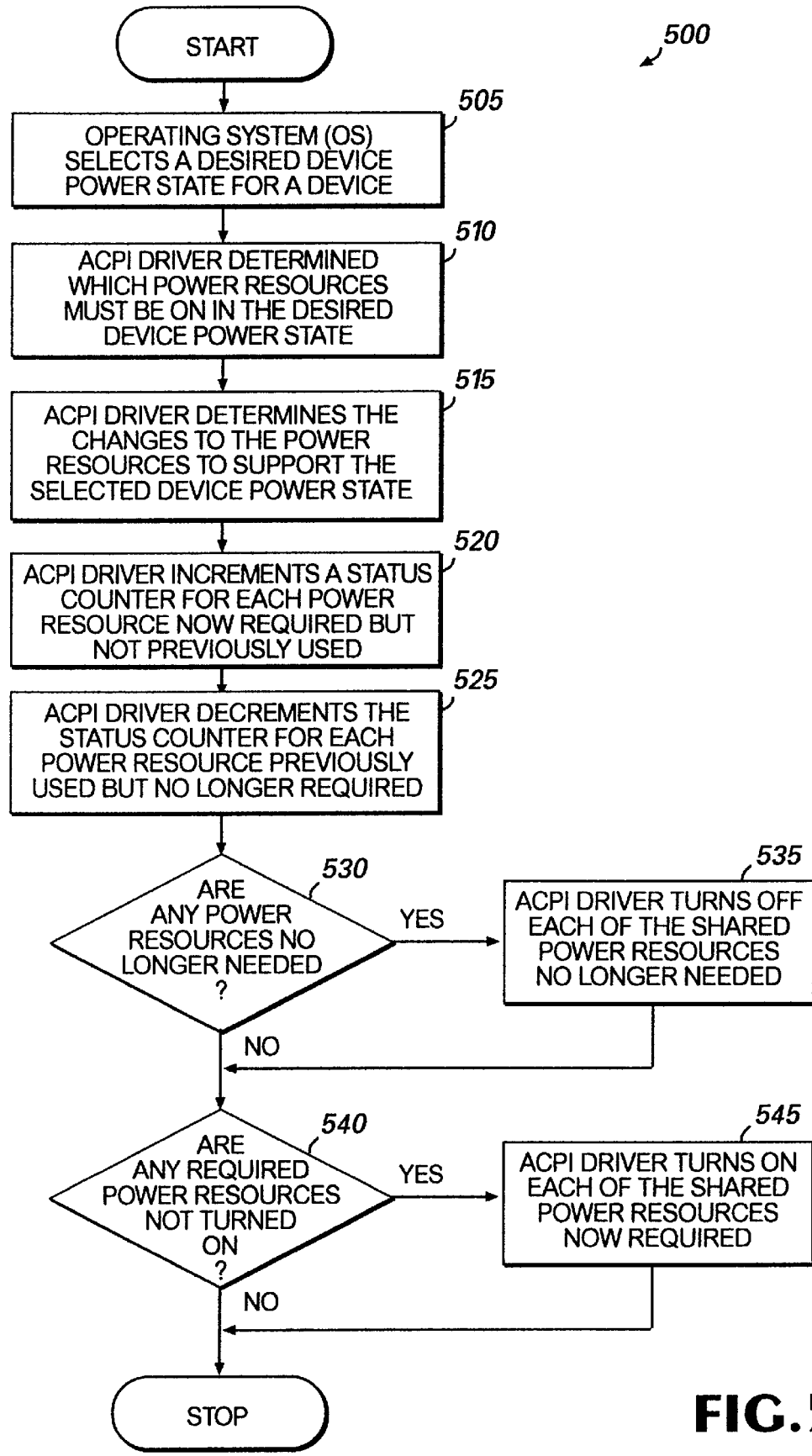
FIG. 5 is a flow diagram illustrating more detailed steps of the preferred method for obtaining a desired power state of a device.

FIGS. 4–8 are flow diagrams illustrating how these data structures are used for such purposes. On the device level, FIG. 4 illustrates steps of the preferred method for obtaining a desired power state of a device in a computer system. FIG. 5 illustrates more detailed steps of the preferred method for obtaining a desired power state of a device.

Figure 8:
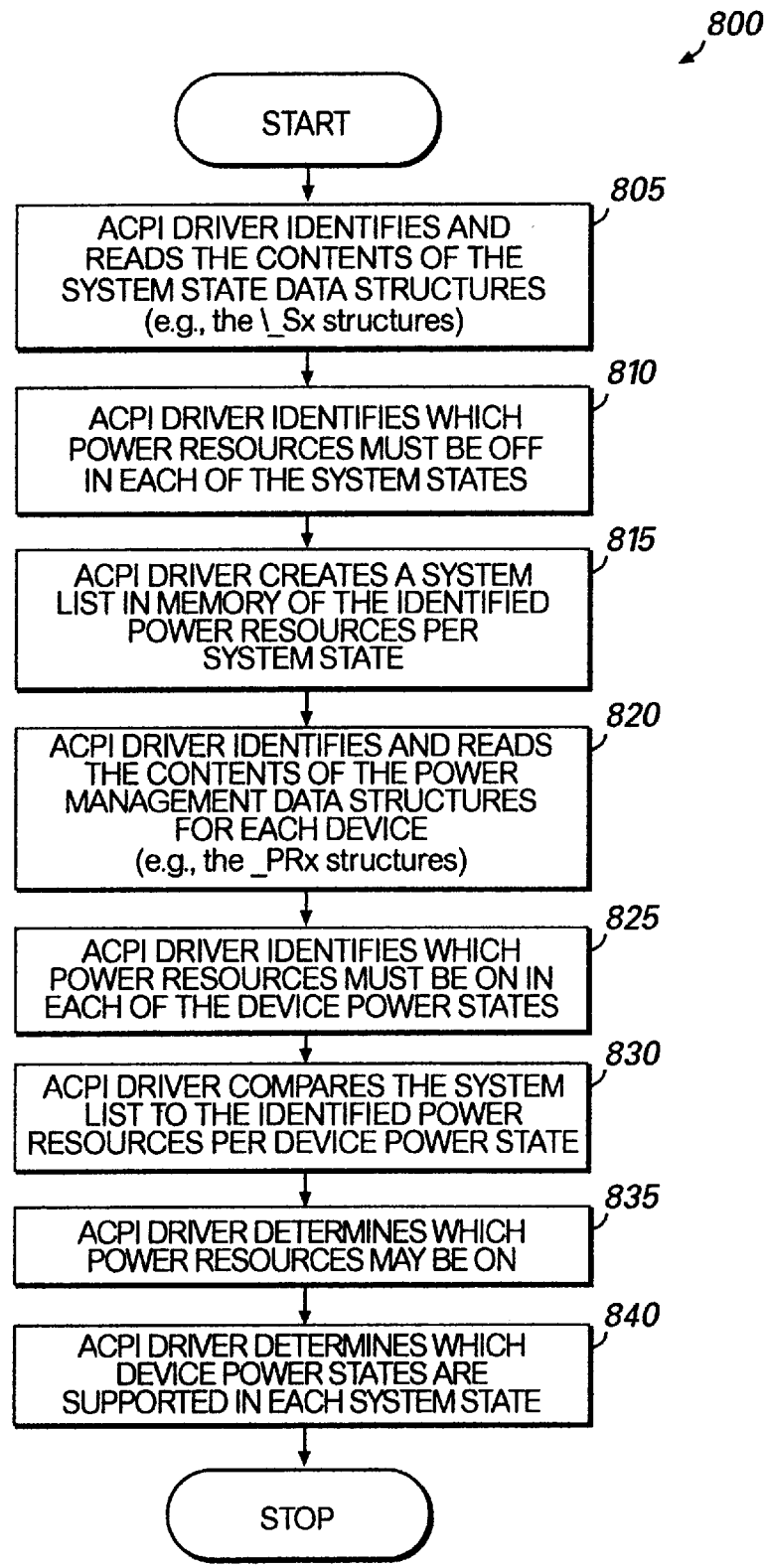
FIG. 8 is a flow diagram illustrating the steps of the preferred method for identifying power dependencies on a device level and on a system level.

On the higher level of the computer system, FIG. 6 illustrates steps of the preferred method for putting the computer system into a sleeping system state while wake-enabling selected devices within the computer system. FIG. 7 illustrates in more detail the steps of the preferred method for putting the computer system into a sleeping system state while wake-enabling selected devices within the computer system. Furthermore, FIG. 8 illustrates the steps of the preferred method for identifying power dependencies on a device-level and on a system-level. Thus, the specialized data structures are used in a variety of useful ways to identify power management related information, such as which power resources must be on or off, and to manage the power consumed within the computer system.

Generally, while the computer system 5 is in a fully on or working system state, such as the S0 state, the operating system 36 can advantageously turn on and off any of the devices in order to manage the power consumed within the computer system 5. This gives the operating system 36 a great deal of flexibility when managing power consumption within the computer system 5. For example, if the operating system 36 may decide to turn off or change the device power state of the modem 29 in order to conserve power. In this fully on system state, it is typically assumed that any of the power resources 35a–c may be used.

As previously mentioned, FIG. 4 is a flow diagram illustrating steps of the preferred method for obtaining a desired power state of a device, such as the modem 29, in the computer system. Referring now to FIGS. 1, 2, 3, and 4, the preferred method 400 starts at step 405 when the operating system 36 selects a desired device power state for a device. In an illustrative example of the preferred method 400 using the modem 29 as the device, the operating system 36 would select one of the defined device power states for the modem 29. In this example, the defined device power states for the modem 29 would be generally described as follows in Table 1:

TABLE 1

| Device Power State | Description of Device Power State |
|---|---|
| D0 | Modem Controller 205 on<br>Telephone Interface 210 on |
| D1 | Modem Controller 205 in low power mode (context retained)<br>Telephone Interface 210 powered by telephone line 230 |
| D2 | (not used for this device) |
| D3 | Modem Controller 205 off (context lost)<br>Telephone Interface 210 powered by telephone line 230 |

The operating system 36 selects or changes the device power state of a particular device, such as the modem 29, based upon predetermined power policies. For example, the operating system 36 may decide, according to such predetermined power policies, to change device power states from D3 to D0 when a conventional COM port (not shown) connected to the modem controller 205 is opened or turned on if the modem 29 is an external type of modem that would be connected to such a conventional COM port instead of directly connected to the low speed bus #1 26. The D0 and D1 device power state may be changed to D3 when the conventional COM port (not shown) is closed or turned off. The D0 working device power state may be changed to D1 when the modem 29 is put in an answer mode (i.e., a low power consumption state where the modem 29 can still detect a ring on the telephone line 230). Finally, the D1 device power state may be changed to D0 when any application program module requests to dial out on the telephone line 230 or a ring on the telephone line 230 is detected while the modem 29 is in the answer mode. One skilled in the art will recognize that these predetermined power policies can be changed in order to alter when devices are turned on or placed into lower power consumption device power states. Moreover, it is important to note that the present invention is capable of dealing with an endless variety of power policies.

At step 410, the ACPI driver 38 determines which of the power resources must be on to support the device in the desired power state. This is preferably accomplished by reading the power management data structure 350*a–c* associated with the desired device power state for the device. In the illustrative example, the ACPI driver 38 would search within the HDS 40 for an enumerated device object, such as the modem device object 345, that is associated with the modem 29 (the device) and identify a power management data structure corresponding to the desired device power state of the device. In other words, if the D1 device power state of the modem 29 was selected at step 405, then the "\_PR1" power management data structure 350*b* is identified which maintains a listing of which power resources 35*a–c* must be on in the D1 device power state of the modem 29.

In the illustrative example, each of the power management data structures 350*a–c* contain a list of required power resources 35*a–c* that must be turned on to support the modem 29 in that particular device power state as shown in Table 2:

TABLE 2

| Device Power States | List of Power resources that Must be Turned On | Corresponding Power Management Data Structure |
| --- | --- | --- |
| D0 | Power Resource #1 35a<br>Power Resource #2 35b | \_PR0 |
| D1 | Power Resource #1 35a | \_PR1 |
| D3 | None Required | \_PR3 |

Thus, if the D1 device power state of the modem 29 was selected, then only power resource #1 35*a* (controlling the power plane #1 245) must be turned on.

At step 415, the ACPI driver 38 determines the changes to the power resources 35*a–c* in order to support the desired device power state. This is preferably accomplished by comparing the power resources required by the previous device power state to the power resources required by the desired device power state.

At step 420, the ACPI driver updates a list, preferably called the Device Power Resource List, to advantageously track the changes in the status of the power resources. In other words, the status, which is updated with the determined changes, is essentially a counter that tracks how many devices are using that particular power resource.

At step 425, the ACPI driver 38 determines if any power resources are no longer required by any of the devices in the computer system 5, i.e., which power resources 35*a–c* can be turned off. This is preferably accomplished by referring to the updated list from step 420 to see if the status of any power resource indicates no devices are using that particular power resource. If the power resources that are turned on are still needed by devices within the computer system 5, then step 425 proceeds directly to step 435. However, if any power resources are no longer required by any of the devices, then the ACPI driver 38 turns off each of those power resources in a predetermined "stack ranked" order at step 430 before proceeding to step 435.

The predetermined stacked rank order is used when turning on or off power resources, such as power planes. This is done because some system batteries 41 or power supplies (not shown) that supply the power resources cannot handle the instantaneous change in load when turning multiple power resources on simultaneously. OEM's must assign a "stack ranking" (the predetermined stack order) in order to arrange the power resources in groups of power resources that are then turned on or off in a particular order. This particular order is not optimized, but is merely established as a definite sequence in which to turn on or off the power resources without incurring electrical problems within the computer system 5. Additionally, the grouping of the power resources is established experimentally such that the load on the system battery 41 or power supply (not shown) does not create problems.

In the preferred embodiment, the ACPI driver 38 turns off the power resources no longer needed by executing a control method corresponding to each of the power resources that is no longer needed. For example, if power resource #2 35*b* was already on when the modem 29 entered the D1 device power state and was not needed by the hard disk drive interface 21 and the video adapter 25 in their respective device power states, then the ACPI driver 38 would turn off power resource #2 35*b*. This is accomplished by first finding the second power resource object (SPR2) 325 within the HDS 40 that is associated with power resource #2 35*b*. Then the ACPI driver 38 would identify a child object of the second power resource object (SPR2) 325 that is the control method object for turning off power resource #2 35*b* (i.e., the "\_OFF" control method object 330*b*). Once this control method object is identified, the ACPI driver 38 executes the control method embodied within this object to stop asserting the HCPP\_EN 270, thus de-energizing power plane #2 260 of power resource #2 35*b*.

At step 435, the ACPI driver 38 determines if any of the required power resources listed in the appropriate power management data structure are not turned on. If all of the required power resources are turned on, then the preferred method ends. However, if any of the required power resources listed in the appropriate power management data structure are not turned on, then the ACPI driver 38 turns on those required power resources not already turned on, preferably by executing a corresponding control method, according to the predetermined "stack ranked" order at step 440 before the preferred method 400 ends. For example, if power resource #1 35*a* was not already turned on and the desired device power state required power resource #1 35*a* to be turned on, then the ACPI driver 38 would turn on power resource #1 35*a*. This would preferably be accomplished by first finding the power resource object (SPR1) 315 within the HDS 40 that is associated with power resource #1 35*a*. Then the ACPI driver 38 would identify a child object of the power resource object (SPR1) 315 that is the control method object for turning on power resource #1 35*a* (i.e., the "\_ON" control method object 320*a*). Once this control method object is identified, the ACPI driver 38 executes the control method embodied within this object to assert the LCPP\_EN 255, thus turning on (energizing power plane #1 245) power resource #1 35*a*. Thus, the power state of an individual device can be advantageously changed and managed by the operating system 36 using power management data structures 350*a–c* associated with the individual device.

FIG. 5 is a flow diagram illustrating more detailed steps of the preferred method for obtaining a desired power state of a device. Basically, FIG. 5 and FIG. 4 differ in that step 420 is broken out into two separate steps, step 520 and step 525, in FIG. 5. Referring now to FIGS. 1, 3, 4, and 5, the preferred method 500 includes steps 505 through 515 which are the same as steps 405 through 415, respectively. At step 520, the ACPI driver 38 updates the Device Power Resource List by incrementing the status of a power resource if the power resource must be turned on in the desired device power state and the power resource was not previously used by the device. As previously mentioned, the status of any power resource within the Device Power Resource List is essentially a counter value that indicates the number of devices currently using a particular power resource. Thus, by incrementing the status of the power resource, the Device Power Resource List tracks and reflects the additional devices using that particular power resource.

At step 525, the ACPI driver 38 updates the Device Power Resource List by decrementing the status of a power resource if the power resource is no longer required in the desired device power state and if the power resource was previously used by the device. In this manner, the Device Power Resource List is able to track when devices are no longer using that particular power resource. Steps 530 to 545 are the same as steps 425 to 440, respectively, before the preferred method 500 ends. Thus, on a device level, the device power states of any of the devices may be changed merely by referring to information maintained with each of the power management data structures associated with each of the devices.

In another aspect of the present invention, different data structures (such as system state data structures 310*a–e* and wake data structures 355) are used in conjunction with the power management data structures 350*a–c* to identify the power dependencies of the system and to enable devices to wake the system when a user desires to "put the computer system to sleep" or place the computer system in one of the system states that conserves power. As part of putting the computer system to "sleep", individual devices must be placed in specific device power states that maintain the devices in particular functional levels or turn the devices off. This is accomplished according to the method described above with regard to FIGS. 4 and 5, as part of the overall process of putting the system the computer system to "sleep".

The wake data structure 355 is used, preferably by the operating system 36, to enable devices to wake the computer system 5 from a sleeping system power state. In the preferred embodiment, this wakeup operation does not typically depend on the processor 12 being energized and able to service interrupts. However, the wakeup operation does depend on maintaining a minimum level of power within those devices enabled to wake the computer system 5.

Conventional software interrupts can be used to initiate the operating system 36 to make "policy decisions", such as changing the current system power state or changing the device power state of a particular device. However, hardware wake events (also called power management wake events) are preferably used to transition the computer system 5 from a sleeping system power state (S1–S4) to the working state (S0). An example of such a hardware event is a ring on the telephone line 230 detected by the telephone interface 210 of the modem 29. Those skilled in the art will recognize that the ability to rely solely upon hardware events to wake the computer system 5 allows for more aggressive power management within the computer system 5.

FIG. 6 is a flow diagram illustrating steps of the preferred method for putting the computer system into a sleeping system state while enabling selected devices to wake the computer system. Referring now to FIGS. 1, 2, 3, and 6, the preferred method 600 begins at step 605 when the operating system 36 selects devices within the computer system 5 to be able to wake the computer system 5. At step 610, the ACPI driver 38 identifies the sleeping system state which supports the selected devices (wake devices). The ACPI driver 38 accomplishes this step based upon the contents of wake data structures, such as the "PRW" wake data structure 355 for the modem 29, for each of the selected wake devices. The contents define which power resources must be on to support the capability of the selected wake devices to wake the computer system. These power resources are then compared to the which power resources must be off in each system power state. The lowest system power state that still supports all of the power resources needed by each of the selected wake devices is the selected sleeping system power state.

In the preferred embodiment, the wake data structure is maintained within the HDS 40 and is in a child/parent relationship with a device object, such as the modem device object 345. The ACPI driver 38 uses the HDS 40 to locate the appropriate device object, such as the modem device object 345, then identifies the wake data structure for the corresponding device, such as the "_PRW" wake data structure 355, as a "child" of the appropriate device object.

At step 615, the ACPI driver 38 identifies a chosen device power state for each of the devices within the computer system 5 that supports all of the power resources needed by each of the selected wake devices. For the selected wake devices, the chosen device power state is designated by the contents of the corresponding wake data structure as mentioned above. However, for the rest of the devices in the computer system 5, the chosen device power state is a "don't care" or a predetermined device power state, such as the D3 off state (in order to save energy).

At step 620, the ACPI driver 38 places each of the devices within the computer system 5 into their respective chosen device power states identified at step 615. Typically, this is accomplished by turning on the power resources needed by a device according to the chosen device power state.

At step 625, the ACPI driver 38 turns off all of the power resources that must be off in the selected sleeping system state. In the preferred embodiment, one of the system state data structures 310*a–e* associated with the selected sleeping system state maintains a list of the power resources that must be off in that system state. The power resources 35*a–c* are preferably turned off by executing control methods contained in control method objects, such as the "_OFF" control method object 320*b*.

At step 630, the ACPI driver 38 turns off all of the power resources that are no longer being used by any of the devices within the computer system 5 in order to conserve energy consumption before the preferred method 600 terminates. In the preferred embodiment, these devices which were not selected to wake the computer system 5 would be placed in the off (D3) device power state. Thus, the preferred method 600 places the computer system into a sleeping system state while wake-enabling selected devices within the computer system.

FIG. 7 is a flow diagram illustrating in more detail the steps for putting a computer system into a sleeping system state while enabling selected devices to wake the computer system. Referring now to FIGS. 1, 2, 3, and 7, the preferred method 700 begins at step 705 when the operating system 36 selects devices within the computer system 5 to be able to wake the computer system 5.

At step 710, the ACPI driver 38 determines which power resources are required to support the selected devices (wake devices) preferably by reading the contents of wake data structures associated with each of the selected wake devices.

At step 715, the ACPI driver 38 compares the required power resources to the power resources listed in a System List. The System List maintains a listing of which power resources cannot be turned on in each of the system states of the computer system 5. The information contained within the System List is preferably compiled from the contents of each of the system state data structures 310a–e. By comparing the required power resources to the power resources listed in the System List, the ACPI driver 38 determines which of the system states, corresponding to each of the system state data structures 310a–e, can support the selected wake devices.

At step 720, the operating system 36 selects the lowest of the system states that support all of the required power resources. By selecting the lowest of the system states that support the selected wake devices, the operating system 36 is able to minimize power consumption within the computer system 5 while ensuring the ability to wake the computer system 5 from a sleeping state.

At step 725, the ACPI driver 38 identifies a chosen device power state for each of the selected wake devices within the computer system 5. Each of these identified device power states support the power resources needed by each of the corresponding selected wake devices. In the preferred embodiment, the chosen device power state for each of the selected wake devices is designated within a wake data structure, such as the "_PRW" wake data structure 355 for the modem 29.

At step 730, the ACPI driver 38 identifies a chosen device power state for each of the devices not selected to wake the computer system 5. The actual device power state for these devices does not affect the ability to wake the computer system 5. However, it is desired to place these non-selected devices in a low power consumption device power state in order to minimize the overall power consumed by the computer system 5 as a whole. In the preferred embodiment, a D3 or Off device power state is identified for the devices not selected to wake the computer system 5.

At step 735, the ACPI driver 38 places each of the devices within the computer system 5 into their respective chosen device power states identified at steps 725 and 730.

At step 740, the ACPI driver 38 turns off all the of the power resources that must be off in the sleeping system state selected at step 720. In the preferred embodiment, one of the system state data structures 310a–e associated with the selected sleeping system state maintains a list of the power resources that must be off in that system state. The power resources 35a–c are preferably turned off by executing control methods contained in control method objects, such as the "_OFF" control method object 320b.

At step 745, the ACPI driver 38 turns off all of the power resources that are no longer being used by any of the devices within the computer system 5 in order to conserve energy consumption before the preferred method 700 terminates. This is preferably accomplished by referring to the Device Power Resource List for the status of each power resource within the computer system 5. Thus, the preferred method 700 places the computer system 5 into a sleeping system state while enabling selected wake devices to wake the computer system 5 by referring to wake data structures associated with each of the selected wake devices.

The methods described in connection with FIGS. 6 and 7 use information from special data structures that advantageously identify simple and complex power dependencies within the system. These power dependencies are both on a device level (e.g., which power resources are required to be on in a specific device power state) and on a system level (e.g., which power resources must be off in a particular system state). FIG. 8 illustrates the steps of the preferred method for identifying power dependencies on a device level and on a system level.

Referring now to FIGS. 1, 2, 3, and 8, the preferred method 800 begins at step 805 when the ACPI driver 38 identifies and reads the contents of the system state data structures for the computer system 5, such as the "\_Sx" system state data structures 310a–e in the preferred embodiment. These system state data structures are preferably stored within the HDS 40 and have contents that define corresponding system states of the computer system 5. At step 810, the ACPI driver 38 identifies which of the power resources within the computer system 5 must be off in each of the system states based upon the contents of each system state data structure. At step 815, the ACPI driver 38 creates a list, preferably called a System List, in memory of the identified power resources that must be off per system state. Thus, certain system level power dependencies are identified within the system state data structures.

At step 820, the ACPI driver 38 identifies and reads the contents of the power management data structures for the computer system 5, such as the "_PRx" power management data structures 350a–c in the preferred embodiment. As previously discussed, these power management data structures are preferably stored within the HDS 40 and have contents that define corresponding device power states of each device within the computer system 5. At step 825, the ACPI driver 38 identifies which of the power resources within the computer system 5 must be on in each of the device power states for each device based upon the contents of each power management data structure for each device. Therefore, certain device-level power dependencies are identified within the power management data structures.

At step 830, the ACPI driver 38 compares the System List (i.e., which power resources must be OFF) to the identified power resources per device power state from step 825 (i.e., which power resources must be ON). At step 835, the ACPI driver 38 is able to use this power dependency information to determine which of the power resources may be on in a particular system state based upon the comparison at step 830. Furthermore, at step 840, the ACPI driver 38 is able to use the power dependency information to determine which devices power states are supported in any given system state based upon the comparison at step 830.

In summary, through the use of the system state data structures and the power management data structures, the operating system 36 is able to identify power dependencies on a device-level and on a system-level that allow the operating system 36 to flexibly manage the power consumption within the computer system 5.

SUMMARY OF THE DETAILED DESCRIPTION

From the foregoing description, it will be appreciated that the present invention provides a system for using a set of specialized data structures to identify power dependencies within a computer system, to obtain a desired power stated in a computer system, and to enable a device to wake the computer system. In an embodiment of the present invention, power dependencies within the computer system are identified using a power management data structure and a system state data structure. A power management data structure defines which power resources (e.g., shared power planes, shared clock sources, shared isolation buffers, etc.) must be turned on to support the device in a corresponding device power state. A system state data structure defines which power resources must be turned off in a corresponding system power state. The status of each power resource is tracked and maintained within a Device Power Resource List maintaining information on how many of the devices in the computer system are using each power resource.

Both of these specialized data structures are maintained within a hierarchical data structure and are created when the computer system is booted. These specialized data structures are used by the operating system in another embodiment of the present invention to obtain a desired power state of a computer system. On a device-level, a desired device power state for a device is selected. In response, a power management data structure corresponding to the device power state is read to determine which power resources must be on. Only the power resources that must be on are turned on, and the power resources that are no longer being used are turned off before placing the device in the desired device power state.

In another aspect of the invention, a computer system is described where a wake data structure is used to enable a device to wake the computer system from a low power consumption or sleeping system power state. The wake data structure describes the minimum system power state and which power resources must be on to allow the device to wake the computer system. The devices that can wake the computer system are selected. The operating system identifies the lowest system state that allows the selected wake device to still wake the computer system. The operating system selects a chosen device power state for each of the devices within the computer system and places each device within their respective chosen device power state. Wake devices have a particular chosen device power state that supports that wake device's capability of waking the computer system. Other devices are typically turned off. Finally, the operating system turns off any of power resources within the computer system that are no longer used by any of the devices.

The foregoing system may be conveniently implemented in a program module that creates or uses such specialized data structures that is based upon the flow diagrams in FIGS. 4–8. No particular programming language has been required for carrying out the various procedures described above because it is considered that the operations, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes.

The present invention has been described in relation to particular embodiments which are intended in all respects to be illustrative rather than restrictive. The particular embodiment described is one of a portable personal computer including a modem that is powered by two power planes. However, those skilled in the art will understand that the principles of the present invention apply to any tasks or processes that require managing any kind of power resources or enabling any kind of device to wake another device. Furthermore, one skilled in the art will recognize that the above described processes are not limited to the preferred embodiment of an ACPI-compliant operating system.

Alternative embodiments will become apparent to those skilled in the art to which the present invention pertains without departing from its spirit and scope. Accordingly, the scope of the present invention is defined by the appended claims rather than the foregoing description.

I claim:

1. A computer-readable medium on which is stored a computer program for identifying one or more power dependencies within a computer system using a set of data structures, the computer program comprising instructions, which when executed by a computer system having one or more power resources, perform the steps of:

identifying a system state data structure related to the computer system, the system state data structure being one of the set of data structures;

determining which of the power resources must be off in a current system state by reading the contents of the system state data structure;

identifying a power management data structure related to one of a plurality of devices within the computer system, the power management data structure being another of the set of data structures; and determining which of the power resources must be on to support the device in a selected device power state by reading the contents of the power management data structure, wherein the contents of the system state data structure and the contents of the power management data structure identify the power dependencies within the computer system.

2. The computer-readable medium of claim 1, wherein the instructions, which when executed by the computer system, further perform the step of determining which of the power resources may be turned on by comparing the power resources that must be off in a system state with the power resources that must be on to support the device in a device power state.

3. The computer-readable medium of claim 2, wherein the system state data structure maintains a list of the power resources that must be off in the system state.

4. The computer-readable medium of claim 2, wherein the power management data structure maintains a list of the power resources that must be on in the device power state.

5. The computer-readable medium of claim 1, wherein the instructions, which when executed by the computer system, further perform the step of determining which of the device power states are supported in each of the system states.

6. A method for obtaining a desired power state of a device within a computer system, comprising the steps of:

determining which of a plurality of power resources connected to the device must be on to support the device in the desired device power state by reading a first data structure associated with the device;

turning on each of the determined power resources that are not already turned on; and putting the device into the desired device power state.

7. The method of claim 6 further comprising the step of, in response to the determining step, turning off each of the power resources no longer being used within the computer system.

8. The method of claim 6 further comprising the step of, in response to the determining step, tracking changes in the status of the power resources as if the determined power resources have been turned on.

9. The method of claim 6, wherein the turning on step is performed in a predetermined order of the power resources.

10. The method of claim 7, wherein the turning off step is performed in a predetermined order of the power resources.

11. A method for obtaining a desired power state of a device in a computer system, comprising the steps of:

selecting a device power state as the desired power state of the device;

determining which of a plurality of power resources connected to the device must be on to support the device in the desired device power state by reading a power management data structure associated with the device;

updating a list of the power resources to track changes in the status of the power resources as if the determined power resources have been turned on;

identifying which of the determined power resources are not already turned on;

turning on each of the determined power resources that are not already turned on; and putting the device into the selected device power state.

12. The method of claim 11, wherein the turning on step is performed in a predetermined order of the power resources.

13. The method of claim 11 further comprising the steps, in response to the updating step, of:

identifying which of the power resources are no longer being used within the computer system; and turning off each of the power resources no longer being used within the computer system.

14. The method of claim 13, wherein the turning off step is performed in a predetermined order of the power resources.

15. The method of claim 11 where the updating step comprises:

incrementing a status of a first of the power resources within the list if the first power resource must be turned on in the desired device power state and the device did not previously use the first power resource;

repeating the incrementing step for each of the power resources;

decrementing the status of a second of the power resources within the list if the desired device power state did not require the second power resource to be turned on and the device previously used the second power resource; and repeating the decrementing step for each of the power resources.

* * * * *